US007939810B2

(12) United States Patent
Kawana et al.

(10) Patent No.: US 7,939,810 B2
(45) Date of Patent: May 10, 2011

(54) MASS SPECTROMETER

(75) Inventors: Shuichi Kawana, Osaka (JP); Manabu Shimomura, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 270 days.

(21) Appl. No.: 12/282,017

(22) PCT Filed: Mar. 9, 2006

(86) PCT No.: PCT/JP2006/304608
§ 371 (c)(1),
(2), (4) Date: Sep. 8, 2008

(87) PCT Pub. No.: WO2007/102224
PCT Pub. Date: Sep. 13, 2007

(65) Prior Publication Data

US 2009/0090862 A1 Apr. 9, 2009

(51) Int. Cl.
*B01D 59/44* (2006.01)
*H01J 49/04* (2006.01)
*H01J 49/10* (2006.01)
*H01J 7/24* (2006.01)

(52) U.S. Cl. .................... 250/423 R; 250/425; 250/427; 250/429; 250/288; 250/281; 315/111.81; 315/111.01

(58) Field of Classification Search .............. 250/423 R, 250/425, 427, 429, 288, 281; 315/111.81, 315/111.01
See application file for complete search history.

(56) References Cited

U.S. PATENT DOCUMENTS

| | | | | |
|---|---|---|---|---|
| 5,196,700 | A * | 3/1993 | Kameshima | 250/288 |
| 6,452,338 | B1 * | 9/2002 | Horsky | 315/111.81 |
| 2009/0039252 | A1 * | 2/2009 | Kawana et al. | 250/288 |
| 2009/0199620 | A1 * | 8/2009 | Kawana et al. | 73/23.37 |

FOREIGN PATENT DOCUMENTS

| | | | |
|---|---|---|---|
| JP | 7-294487 | A | 11/1995 |
| JP | 9-190799 | A | 7/1997 |
| JP | 2002-373616 | A | 12/2002 |
| JP | 2005-259482 | A | 9/2005 |

OTHER PUBLICATIONS

Japanese Office Action mailed Nov. 16, 2010 for JP Application No. 2008-503719.

* cited by examiner

*Primary Examiner* — Nikita Wells
(74) *Attorney, Agent, or Firm* — Sughrue Mion, PLLC

(57) ABSTRACT

An electrically conductive heat-blocking plate 11 with an opening 12 for allowing thermions to pass through is provided between a filament 3, whose temperature can be as high as 2000° to 3000° C., and an ionization chamber 2. The heat-blocking plate 11 is thermally connected via an aluminum block 10 to a heater for maintaining the ionization chamber 2 within a range temperature from 200° to 300° C., and also electrically set at a ground potential, which is approximately equal to the potential of the ionization chamber 2. The heat-blocking plate 11 blocks the radiation heat that the filament 3 emits when energized. Thus, the wall of the ionization chamber 2 is prevented from being locally heated to an abnormally high temperature. As a result, the inner space of the ionization chamber 2 is maintained at an approximately uniform temperature, and the noise due to the decomposition of a metallic material by abnormal heating is prevented. The heat-blocking plate 11 also prevents a thermion-accelerating electric field from penetrating through an electron injection port 5 into the ionization chamber 2 and impeding the extraction of ions produced within the ionization chamber 2. Thus, the ion extraction efficiency is also improved.

14 Claims, 2 Drawing Sheets

MASS SPECTROMETER

TECHNICAL FIELD

The present invention relates to a mass spectrometer, and specifically to the structure of an ion source for ionizing sample molecules.

BACKGROUND ART

A mass spectrometer is a device that ionizes molecules or atoms of a sample, then separates the resultant ions according to their mass-to-charge ratio and detects these ions. Various methods for ionizing sample molecules have been developed to date, and electron ionization (EI) is one of the most generally used methods. In electron ionization, sample molecules are introduced into an ionization chamber of a comparatively small capacity, which is placed under a vacuum atmosphere. A filament for generating thermions is provided outside this ionization chamber, and thermions thereby generated are accelerated and injected into the ionization chamber. These thermions come in contact with the sample molecules to ionize these molecules within the ionization chamber. The ions thus produced within the ionization chamber are extracted to the outside by the action of an electric field created by a voltage applied to ion-extracting electrodes (e.g. a lens optical system) provided outside the ionization chamber (for example, refer to Patent Document 1).

In this type of ion source, the filament temperature rises to as high as 2000° to 3000° C., and a portion of the wall of the ionization chamber located close to the filament rises to a considerably high temperature due to the radiation heat from the filament. Normally, the temperature of the ionization chamber is maintained within a range from 200° to 300° C. by a heater that is thermally in contact with the chamber. However, if the a portion of the wall of the ionization chamber is locally heated as explained earlier until its temperature abnormally rises to a specific level, the metallic material constituting the wall of the ionization chamber becomes activated and produces a decomposition product, and this decomposition product may possibly be mixed with the sample molecules and create a noise. The local heating is also unfavorable that it produces an uneven temperature distribution within the ionization chamber, which deteriorates the ion production efficiency.

In the normal electron ionization, a potential difference of approximately 70 V is provided between the filament and the ionization chamber. The application of this potential to the filament creates an external electric field, which penetrates into the ionization chamber and disturbs the electric field present within the same chamber. This disturbance of the latter electric field prevents ions produced within the ionization chamber from being extracted to the outside of the ionization chamber in an intended manner, which causes a decrease in the amount of ions to be analyzed and deteriorates the ion detection efficiency.

Patent Document: Japanese Unexamined Patent Application Publication No. 2002-373616

DISCLOSURE OF THE INVENTION

Problem to Be Solved by the Invention

The present invention has been developed to solve the aforementioned problems, and its first objective is to provide a mass spectrometer in which the influence of the radiation heat from the filament can be alleviated. The second objective of the present invention is to provide a mass spectrometer capable of improving the detection sensitivity by efficiently extracting ions produced in the ionization chamber to the outside of the same chamber and using these ions for mass analysis, while alleviating the influence of the radiation heat.

Means for Solving the Problems

To solve the first objective, the present invention provides a mass spectrometer including an ion source having a filament for generating thermions by being heated and an ionization chamber in which sample molecules are ionized by using the thermions, the ionization chamber having an electron injection port through which the thermions are introduced into the inner space thereof, wherein:

a heat-blocking plate member, in which an opening for allowing electrons to pass through is formed on an axis connecting the filament and the center of the electron injection port, is provided in a space between the filament and the ionization chamber.

Examples of ionization methods used in the ion source include electron ionization (EI), chemical ionization (CI) and negative chemical ionization (NCI). In EI, the thermions directly react with the sample molecules and ionize these molecules, whereas, in CI and NCI, thermions are indirectly used for ionization. Specifically, these two techniques use thermions to ionize the molecules of a reagent gas, which are introduced into the ionization chamber in addition to the sample gas, and the reagent gas ions thereby produced react with the sample molecules to ionize these molecules.

Effect of the Invention

In the mass spectrometer according to the present invention, the heat-blocking plate member shields the ionization chamber against the radiation heat from the filament and thereby prevents the wall of the ionization chamber from being locally heated by the radiation heat. Thus, the wall material of the ionization chamber (normally a metallic material) is protected from heat decomposition, which would arise if a portion of the wall was heated to an extremely high temperature, and the noise that results from the heat decomposition is reduced. Furthermore, the efficiency of producing ions originating from the sample molecules concerned will improve since the temperature distribution within the ionization chamber can be easily uniformized.

The temperature of the ionization chamber is normally maintained at an approximately constant level by a heating unit that is thermally connected to the chamber. In such a case, it is preferable that the heat-blocking plate member be thermally connected to the heating unit for heating the ionization chamber.

This configuration is effective in preventing an excessive rise in the temperature of the heat-blocking plate member since the heating unit also controls to some extent the temperature of heat-blocking plate member. Furthermore, this configuration suppresses the power consumption of the heating unit since the heat absorbed by the heat-blocking plate member can be used for maintaining the temperature of the ionization chamber.

In the mass spectrometer according to the present invention, the heat-blocking plate member may be made of an insulating material from the viewpoint of the heat-blocking effect. However, it is preferable that the heat-blocking plate member be made of an electrically conductive material. In this case, the electrically conductive plate member may be preferably set at a predetermined potential.

In this configuration, the electrically conductive plate member alleviates the influence of the thermion-accelerating electric field created by a potential difference between the filament and the ionization chamber. Thus, the influence of the electron-accelerating electric field penetrating through the electron injection port into the ionization chamber is suppressed, so that an ion-extracting electric field created within the ionization chamber by a potential difference between the lens optical system and the ionization chamber is less disturbed. Therefore, ions produced within the ionization chamber can be efficiently extracted to the outside of the ionization chamber and transported through the lens optical system to the mass analyzer section, such as a quadrupole mass filter. As a result, the ion detection efficiency improves. This is advantageous to high-sensitivity analyses.

Specifically, it is preferable that the electrically conductive heat-blocking plate member be identical in potential to the ionization chamber. For example, if the ionization chamber is at a ground potential, the heat-blocking plate member should also be preferably at a ground potential.

This configuration allows almost no electric field to be present in the space between the ionization chamber and the heat-blocking plate member, while a strong electric field for accelerating thermions is created in the space between the heat-blocking plate member and the filament. Thus, the thermions produced by the filament can be efficiently extracted and accelerated toward the electron injection port of the ionization chamber, whereby the ion production efficiency within the ionization chamber is further improved.

In a preferable mode of the mass spectrometer according to the present invention, the heat-blocking plate member is located closer to the filament from the middle point between the outer wall surface of the ionization chamber and the filament.

This configuration increases the potential gradient of the electric field in the space between the filament and the heat-blocking plate member and thereby gives thermions a greater magnitude of initial kinetic energy, whereby the thermions produced by the filament will be more efficiently supplied into the ionization chamber.

BEST MODE FOR CARRYING OUT THE INVENTION

Figure 1:
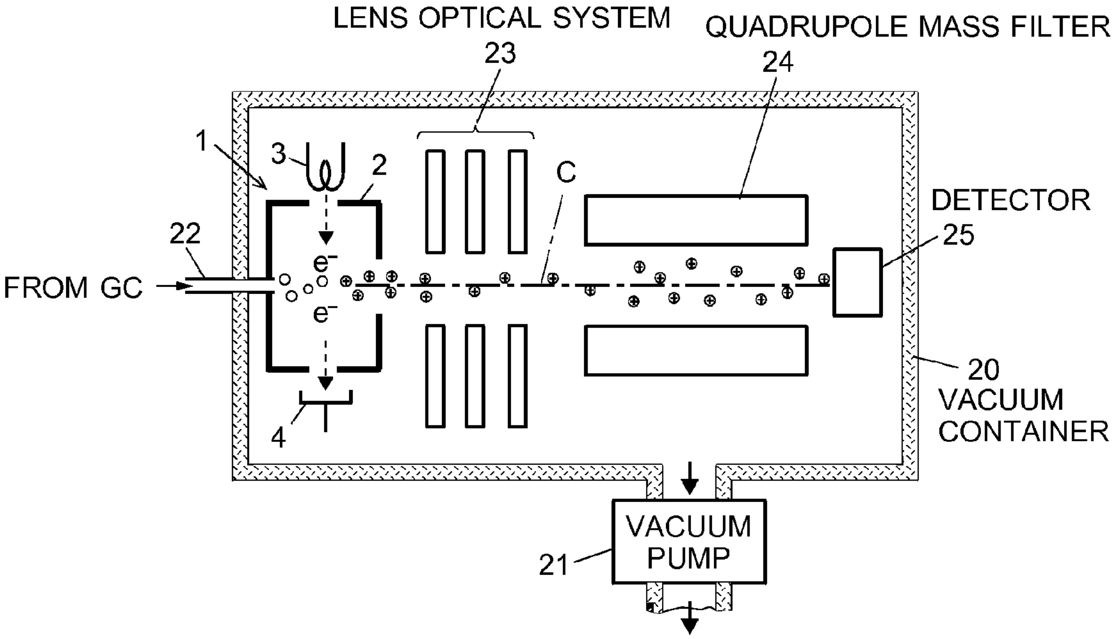
FIG. 1 is an overall configuration diagram of a mass spectrometer according to an embodiment of the present invention.
Figure 2:
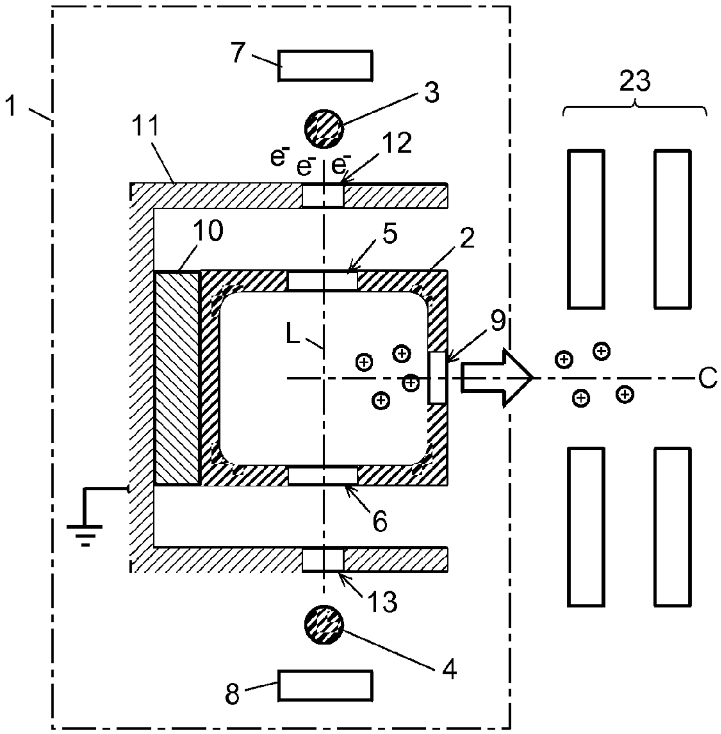
FIG. 2 is a vertical sectional view showing the detailed structure of an ion source used in the mass spectrometer of the present embodiment.
Figure 3:
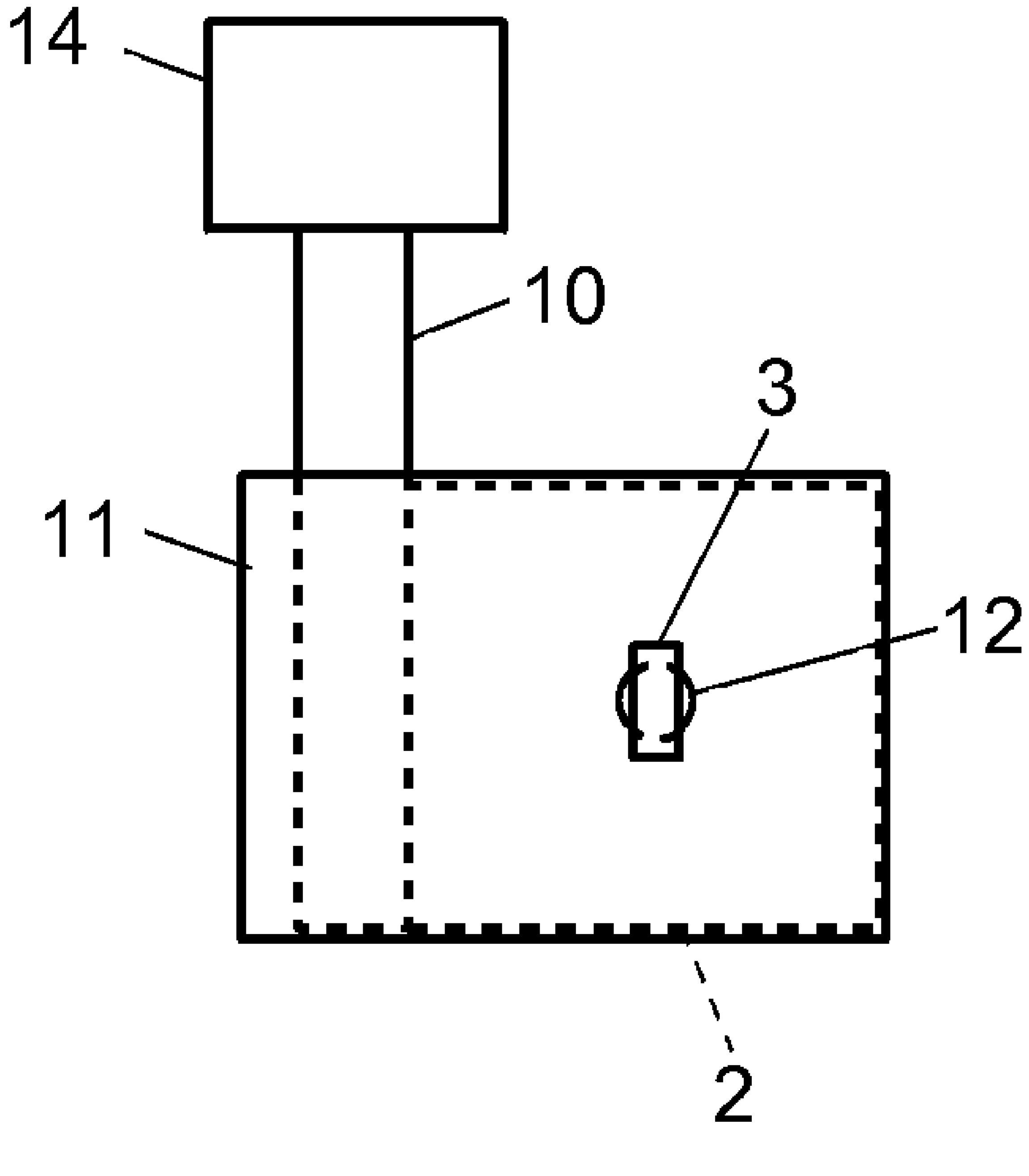
FIG. 3 is a top view of the ion source used in the mass spectrometer of the present embodiment.

A mass spectrometer according to an embodiment of the present invention is hereinafter described with reference to the attached drawings. FIG. 1 is an overall configuration diagram of the mass spectrometer of the present embodiment, FIG. 2 is a vertical sectional view showing the detailed structure of an ion source, and FIG. 3 is a top view of the ion source. The ion source in the mass spectrometer of the present embodiment is an ion source that performs electron ionization.

In FIG. 1, the vacuum container 20 is a substantially hermetically sealed container, which is evacuated by a vacuum pump 21. Contained in this container are an ion source 1, a lens optical system 23, a quadrupole mass filter 24 and an ion detector 25, all being arranged along an ion optical axis C. A sample, such as a sample gas coming from the column of a gas chromatograph (not shown), is supplied through an appropriate interface and the introduction pipe 22 into the ion source 1. The sample molecules contained in the sample gas are ionized in this ion source 1.

Various kinds of ions thus produced are extracted rightward from the ion source 1, then converged by the lens optical system 23 and introduced into the space extending along the longitudinal axis of the quadrupole mass filter 24 consisting of four rod electrodes. A voltage consisting of a radio-frequency voltage superposed on a DC voltage is applied from a power source (not shown) to the quadrupole mass filter 24, and only the ions having a mass-to-charge ratio corresponding to the applied voltage can pass through the axially-extending space and arrive at, and detected by, the ion detector 25. The other, unnecessary ions cannot pass through the axially-extending space of the quadrupole mass filter 24; they will be diverged and lost halfway. Accordingly, it is possible, for example, to perform a scan operation in which the voltage applied to the quadrupole mass filter 24 is scanned over a predetermined range so that the mass-to-charge ratio at which the ions can reach the ion detector 25 will change over a predetermined mass range, and create a mass spectrum from the detection signals obtained by this operation.

With reference to FIGS. 2 and 3 in addition to FIG. 1, the structure of the ion source 1 performing electron ionization is hereinafter detailed. The ionization chamber 2 has a substantially box-shaped body made of a metal such as stainless steel, to which the sample introduction pipe 22 is connected. Sample molecules are supplied through this pipe 22 into the ionization chamber 2. This chamber 2 has an ion ejection port 9 on the ion optical axis C, and ions can be extracted through this port 9 to the outside. The ionization chamber 2 also has an electron injection port 5 and electron ejection port 6 that are respectively formed in the two walls facing each other across the ion optical axis C. A filament 3 is provided outside the electron injection port 5, and another filament that is identical in shape to the filament 3 is provided as the trap electrode 4 outside the electron ejection port 6.

When a heating current is supplied from a heating current source (not shown) to the filament 3, the temperature of the filament 3 rises and thermions are emitted from it. Due to the action of an electric field to be described later, the emitted thermions are accelerated toward the trap electrode 4 and pass through the ionization chamber 2 along the thermionic current axis L, which is substantially perpendicular to the ion optical axis C. The reason for the use of the trap electrode 4 being identical in shape to the filament 3 is to enable the two filaments to exchange their functions. In addition, a pair of magnets 7 and 8 are provided outside the filament 3 and the trap electrode 4, respectively. These magnets 7 and 8 create a magnetic field within the space between the filament 3 and the trap electrode 4.

An aluminum block 10 with a high thermal conductivity is closely attached to one face of the ionization chamber 2 so that heat can be conducted between them, and a heater 14 is attached to a laterally-extending end of the block 10. The heat generated by the heater 14 can be easily conducted through the aluminum block 10 to maintain the entirety of the ionization chamber 2 at an approximately constant temperature. A heat-blocking plate 11, which is made of an electrically conductive material (e.g. SUS316 stainless steel) and shaped like an angular “C” character, is closely attached to the block 10. The upper horizontal section of the heat-blocking plate 11 extends between the filament 3 and the ionization chamber 2, and the lower horizontal section between the trap electrode 4 and the ionization chamber 2. The two horizontal sections are provided with openings 12 and 13, respectively, for allowing thermions to pass through along the thermionic current axis L. The upper horizontal section of the heat-blocking plate 11 is located closer to the filament 3 from the middle point of the distance between the outer wall surface of the ionization chamber and the filament 3.

The aluminum block 10 thermally connects the heat-blocking plate 11 to the heater 14, and also electrically connects the heat-blocking plate 11 to the ionization chamber 2 with almost no electric resistance. Since the ionization chamber 2 is at a ground potential in this embodiment, the heat-blocking plate 11 can also be regarded as being at a ground potential.

In the previously described configuration, for example, a voltage of −70[V] is applied to the filament 3, and a voltage of 0[V] to the trap electrode 4. As is evident from the preceding explanation, the potential of the upper horizontal section of the heat-blocking plate 11 is 0[V], and the space between the filament 3 and the heat-blocking plate 11 is relatively small. Therefore, a strong electron-accelerating electric field is created in the space between the filament 3 and the heat-blocking plate 11 with a potential gradient that acts on an electron to accelerate it from the filament 3 to the ionization chamber 2. On the other hand, there is basically no electric field in the space between the heat-blocking plate 11 and the ionization chamber 2 except for a faint electric field penetrating through the opening 12 or leaking from the interior of the ionization chamber 2 through the electron injection port 5. Therefore, the thermions generated by the filament 3, which are initially given a large magnitude of kinetic energy and accelerated toward the electron injection port 5 of the ionization chamber 2, will have no additional gain of kinetic energy after they pass through the opening 12. However, the thermions continue their flight by the previously obtained kinetic energy and eventually enter the ionization chamber 2. In this chamber, when a thermion ($e^-$) comes in contact with a sample molecule (M), a molecule ion $M^{+\cdot}$ is produced by the following reaction: $M+e^- \rightarrow M^{+\cdot}+2e^-$. The resultant thermions eventually exit from the electron ejection port 6 to the outside of the ionization chamber 2 and arrive at the trap electrode 4, thus producing a trap current in the trap electrode 4.

The number of electrons captured by the trap electrode 4 depends on the number of electrons emitted from the filament 3. Accordingly, a control circuit (not shown) is provided to control the heating current supplied to the filament 3 so that the trap current produced by the electrons arriving at the trap electrode 4 is maintained at a predetermined level. This operation makes the filament 3 generate thermions at an approximately constant rate, and thereby stabilizes the production of ions within the ionization chamber 2. When flying toward the trap electrode 4, each thermion follows a spiral path due to the action of the magnetic field created by the magnets 7 and 8. This spiral path enables the thermion to stay longer in the ionization chamber 2 and accordingly have a greater chance of coming in contact with sample molecules, whereby the ionization efficiency is improved.

Meanwhile, a predetermined voltage whose polarity opposes that of the ions is applied to the lens optical system 23. A portion of the electric field created by the potential difference between the lens optical system 23 and the ionization chamber 2 penetrates through the ion ejection port 9 into the ionization chamber 2 and acts on the ions to extract them through the ion ejection port 9 to the outside. Thus, an electric field for extracting ions through the ion ejection port 9 to the outside is created within the ionization chamber 2. Due to this electric field, the ions produced by the aforementioned reaction are extracted to the outside of the ionization chamber 2, and then transported through the lens optical system 23 to the quadrupole mass filter 24.

When being energized, the filament 3 has a temperature as high as 2000° to 3000° C., and heats surrounding objects to considerably high temperatures by radiation heat. However, in the present embodiment, the wall of the ionization chamber 2 is prevented from being directly heated by the radiation heat since the upper horizontal section of the heat-blocking plate 11 is present between the ionization chamber 2 and the filament 3. Accordingly, the ionization chamber 2 will never have the conventional problem that a portion of its wall is abnormally heated, and the inner temperature of the ionization chamber 2 will be more uniform by temperature control. Under these conditions, the metallic material constituting the ionization chamber 2 will not be decomposed and mixed into the sample molecules or ions. Thus, the amount of noise due to the decomposition product is reduced. The improved uniformity of the temperature within the ionization chamber 2 also leads to a constant production of ions under favorable conditions.

Furthermore, the electrically conductive heat-blocking plate 11 prevents the situation where the thermion-accelerating electric field penetrates through the electron injection port 5 into the ionization chamber 2 and thereby disturbs the ion-extracting electric field within the ionization chamber 2, causing a portion of the ions to easily diverge from the path to the ion ejection port 9 and exit from the electron injection port 5 to the outside or collide with the inner surface of the ionization chamber 2. As a result, the efficiency of extracting ions produced within the ionization chamber 2 will be further enhanced.

The inventors have conducted an experiment for determining how the presence of the heat-blocking plate 11 affects the signal strength of the ion detector 25, provided that the other conditions are identical. The result demonstrated that the signal strength increased by approximately 14% when the heat-blocking plate 11 was present.

It is obvious that the preceding embodiment is a mere example, and any changes, modifications or additions can be made within the spirit and scope of the present invention.

For example, the heat-blocking plate 11 in the previous embodiment was identical in potential to the ionization chamber 2. However, the two potentials do not need to be identical but may be appropriately set at different levels. As another modification, the heat-blocking plate 11 may be provided as an integral part of the box-shaped body of the ionization chamber 2.

The previous embodiment was an application of the present invention to an EI ion source. The present invention can be applied to a CI or NCI ion source, which indirectly use thermions in the ionization process. For a CI or NCI ion source, a reagent gas supply pipe for introducing a reagent gas into the ionization chamber 2 should be added to the previous embodiment, and the sizes of the electron injection port 5, electron ejection port 6, ion ejection port 9 and other elements should be appropriately modified. In some cases, the volume of the ionization chamber 2 may be appropriately changed. The ion production conditions, such as the vacuum degree or temperature in the vacuum container 20, can also be appropriately changed if necessary.

The invention claimed is:

1. A mass spectrometer including an ion source having a filament for generating thermions by being heated and an ionization chamber in which sample molecules are ionized by using the thermions, the ionization chamber having an electron injection port through which the thermions are introduced into an inner space thereof, wherein:

a heat-blocking plate member, in which an opening for allowing electrons to pass through is formed on an axis connecting the filament and a center of the electron injection port, is provided in a space between the filament and the ionization chamber.

2. The mass spectrometer according to claim 1, wherein the heat-blocking plate member is thermally connected to a heating unit for heating the ionization chamber

3. The mass spectrometer according to claim 1, wherein the heat-blocking plate member is made of an electrically conductive material.

4. The mass spectrometer according to claim 3, wherein the electrically conductive heat-blocking plate member is identical in potential to the ionization chamber.

5. The mass spectrometer according to claim 1, wherein the heat-blocking plate member is located closer to the filament from a middle point between an outer wall surface of the ionization chamber and the filament.

6. The mass spectrometer according to claim 2, wherein the heat-blocking plate member is made of an electrically conductive material.

7. The mass spectrometer according to claim 6, wherein the electrically conductive heat-blocking plate member is identical in potential to the ionization chamber.

8. The mass spectrometer according to claim 2, wherein the heat-blocking plate member is located closer to the filament from a middle point between an outer wall surface of the ionization chamber and the filament.

9. The mass spectrometer according to claim 3, wherein the heat-blocking plate member is located closer to the filament from a middle point between an outer wall surface of the ionization chamber and the filament.

10. The mass spectrometer according to claim 4, wherein the heat-blocking plate member is located closer to the filament from a middle point between an outer wall surface of the ionization chamber and the filament.

11. The mass spectrometer according to claim 6, wherein the heat-blocking plate member is located closer to the filament from a middle point between an outer wall surface of the ionization chamber and the filament.

12. The mass spectrometer according to claim 7, wherein the heat-blocking plate member is located closer to the filament from a middle point between an outer wall surface of the ionization chamber and the filament.

13. The mass spectrometer according to claim 7, wherein the heating unit includes a conductive member attached to the ionization chamber, and the conductive member thermally connects the heat-blocking plate member to a heater of the heating unit and also electrically connects the heat-blocking plate member to the ionization chamber.

14. The mass spectrometer according to claim 12, wherein the heating unit includes a conductive member attached to the ionization chamber, and the conductive member thermally connects the heat-blocking plate member to a heater of the heating unit and also electrically connects the heat-blocking plate member to the ionization chamber.

* * * * *